United States Patent
Ogawa et al.

(10) Patent No.: US 8,333,422 B2
(45) Date of Patent: Dec. 18, 2012

(54) SUN VISOR FOR VEHICLES

(75) Inventors: Hiroto Ogawa, Toyota (JP); Ryo Tsushima, Toyota (JP)

(73) Assignee: Kyowa Sangyo Co., Ltd., Toyota (JP)

( * ) Notice: Subject to any disclaimer, the term of this patent is extended or adjusted under 35 U.S.C. 154(b) by 0 days.

(21) Appl. No.: 13/088,850

(22) Filed: Apr. 18, 2011

(65) Prior Publication Data

US 2011/0260492 A1    Oct. 27, 2011

(30) Foreign Application Priority Data

Apr. 23, 2010    (JP) ................................. 2010-100367

(51) Int. Cl.
*B60J 3/02*    (2006.01)

(52) U.S. Cl. .................................................. 296/97.11

(58) Field of Classification Search ............... 296/97.11; B60J 3/02

See application file for complete search history.

(56) References Cited

U.S. PATENT DOCUMENTS

| | | | | |
|---|---|---|---|---|
| 2,038,906 A | * | 4/1936 | Ruhland | 296/97.11 |
| 2,299,775 A | * | 10/1942 | Westrope | 296/97.11 |
| 7,798,551 B2 | * | 9/2010 | Okazaki et al. | 296/97.11 |
| 2006/0138799 A1 | * | 6/2006 | Wang et al. | 296/97.11 |

FOREIGN PATENT DOCUMENTS

| | | | |
|---|---|---|---|
| DE | 3402416 | * | 7/1985 |
| JP | 2007-131168 | * | 5/2007 |
| JP | A-2008-284973 | | 11/2008 |

\* cited by examiner

*Primary Examiner* — Dennis Pedder
(74) *Attorney, Agent, or Firm* — Oliff & Berridge, PLC

(57) ABSTRACT

The representative sun visor for vehicles has a sun visor body which can slide in an axial direction of a support rod together with a guide member with respect to a movable element. The sun visor includes a friction mechanism which imposes a predetermined frictional resistance to the relative movement of the sun visor body with respect to the movable element. The friction mechanism has a sliding member and a biasing member. The sliding member is slidably held in contact with the guide member and imposes a frictional resistance to the guide member, and the biasing member applies a biasing force in a direction that holds the sliding member and the guide member in contact with each other. The guide member and the sliding member have a plurality of sliding contact portions on which the biasing force of the biasing member acts in different directions.

4 Claims, 8 Drawing Sheets

SUN VISOR FOR VEHICLES

BACKGROUND OF THE INVENTION

1. Field of the Invention

The invention relates to a slide-type sun visor for vehicles, having a sun visor body which can move in an axial direction of a support rod.

2. Description of the Related Art

Japanese non-examined laid-open Patent Publication No. 2008-284973 discloses a slide-type sun visor for vehicles having a sun visor body which can slide in an axial direction of a support rod fixed to a vehicle body side. This known sun visor includes an elongate guide member which has a concave section and is fixedly disposed along an upper edge of the sun visor body, and a movable element which is prevented from moving in the axial direction of the support rod and allowed to pivot around an axis of the support rod with respect to the support rod mounted to a vehicle body side (a front interior roof surface of the vehicle). The guide member is mounted to the movable element such that it can slide in the axial direction of the support rod. Therefore, the sun visor body can change its position in the axial direction of the support rod by sliding together with the guide member with respect to the movable element. Such a positional change by sliding movement of the sun visor body is mainly made with the sun visor body placed along a side window.

The above-described known sun visor having the slide-guide structure is provided with a friction mechanism which imposes an appropriate sliding resistance caused by friction between the movable element and the guide member in order to obtain stability or smoothness of the sliding movement. The friction mechanism includes a friction member which imposes sliding resistance to the guide member, and a biasing member which biases in such a manner as to press the friction member toward a bottom of the guide member which has a concave section. Therefore, rattle of the friction member with respect to the guide member can be prevented in the direction in which the friction member is pressed against the guide member by the biasing member, but cannot be prevented in a lateral direction of the concave section transverse to the pressing direction. As a result, stability or smoothness of the sliding movement is impaired. In this point, further improvement is desired.

SUMMARY OF THE INVENTION

Accordingly, it is an object of the invention to provide a stability of sliding movement of a sun visor body within a slide-type sun visor for vehicles in which the sun visor body can move in an axial direction of a support rod.

Above object can be achieved by a claimed invention. The representative sun visor for vehicles according to the invention has a sun visor body, a support rod for mounting the sun visor body to a vehicle body, an elongate guide member that is fixedly disposed within the sun visor body and extends in an axial direction of the support rod, and a movable element that is disposed within the sun visor body. The movable member is mounted to the support rod such that it is allowed to pivot around an axis of the support rod while being prevented from moving in the axial direction of the support rod with respect to the support rod, and also mounted to the guide member such that it can move in the extending direction of the guide member with respect to the guide member. The sun visor body can change its position between a predetermined storage position and a use region other than the storage position by pivoting around the axis of the support rod together with the guide member and the movable element. Further, the sun visor body can change its position in the axial direction of the support rod by moving together with the guide member with respect to the movable element. The slide-type sun visor for vehicles is constructed as described above.

In a preferred embodiment of the invention, a sliding member and a biasing member are provided. The sliding member is held in contact with the guide member such that it can slide with respect to the guide member. The biasing member applies a biasing force to hold the sliding member and the guide member in contact with each other. The biasing force of the biasing member is divided into different directions and exerted between the sliding member and the guide member, so that a frictional force which corresponds to components of the biasing force divided into the different directions is generated between the sliding member and the guide member.

According to the invention, with the construction in which the biasing force of the biasing member is divided into different directions and exerted between the sliding member and the guide member such that a frictional force corresponding to components of the biasing force divided into the different directions is generated between the sliding member and the guide member, when the direction of relative movement of the sliding member and the guide member is taken, for example, as a lateral direction, rattle between the guide member and the sliding member in the vertical direction and the fore-and-aft direction which are transverse to the lateral direction can be prevented. Thus, rattling noise (interfering noise) can be prevented from being generated between the guide member and the sliding member when the sun visor body is moved in the axial direction of the support rod in order to change its position, or by vibration of the vehicle body. Furthermore, stability of the movement of the sun visor body with respect to the support rod can be achieved.

According to a further aspect of the sun visor for vehicles in the invention, the sliding member has a plurality of sliding regions which are held in contact with the guide member, and the sliding regions are configured to receive the components of the biasing force divided into the different directions. Further, the manner of contact of the "sliding region" with the guide member in this invention suitably includes contact between plane surfaces, contact between curved surfaces, point contact with a plane surface and line contact with a plane surface.

By provision of the construction in which components of the biasing force of the biasing member act on a plurality of sliding contact portions, the number of the biasing members can be reduced. Therefore, this construction is effective in reduction of the number of parts and cost reduction.

According to a further aspect of the sun visor for vehicles in the invention, the guide member includes a vertical portion extending in a vertical direction transverse to the axis of the support rod and a horizontal portion extending transversely to the vertical portion in the state in which the sun visor body is vertically placed. Further, the sliding member has a first sliding region which is held in contact with the vertical portion of the guide member and a second sliding region which is held in contact with the horizontal portion of the guide member.

By provision of the construction in which the guide member is formed by a rail-like member having the vertical portion and the horizontal portion which extend transversely to each other, or in other words, the guide member is formed by a rail-like member having a generally L-shaped section, rattle can be rationally prevented in two directions transverse to each other.

According to a further aspect of the sun visor for vehicles in the invention, the guide member includes two inclined portions which are inclined at a predetermined angle to a line extending in a vertical direction transverse to the axis of the support rod and extend transversely to each other in a state in which the sun visor body is vertically placed. Further, the sliding member has a first sliding region which is held in contact with one of the inclined portions of the guide member and a second sliding region which is held in contact with the other inclined portion.

By provision of the construction in which the guide member is formed by the rail-like member having the two inclined portions which extend transversely to each other, or in other words, the guide member is formed by a rail-like member having a generally V-shaped section, rattle can be rationally prevented in two directions transverse to each other.

Other objects, features and advantages of the invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved sun visor for vehicle and method for using such sun visor for vehicle and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
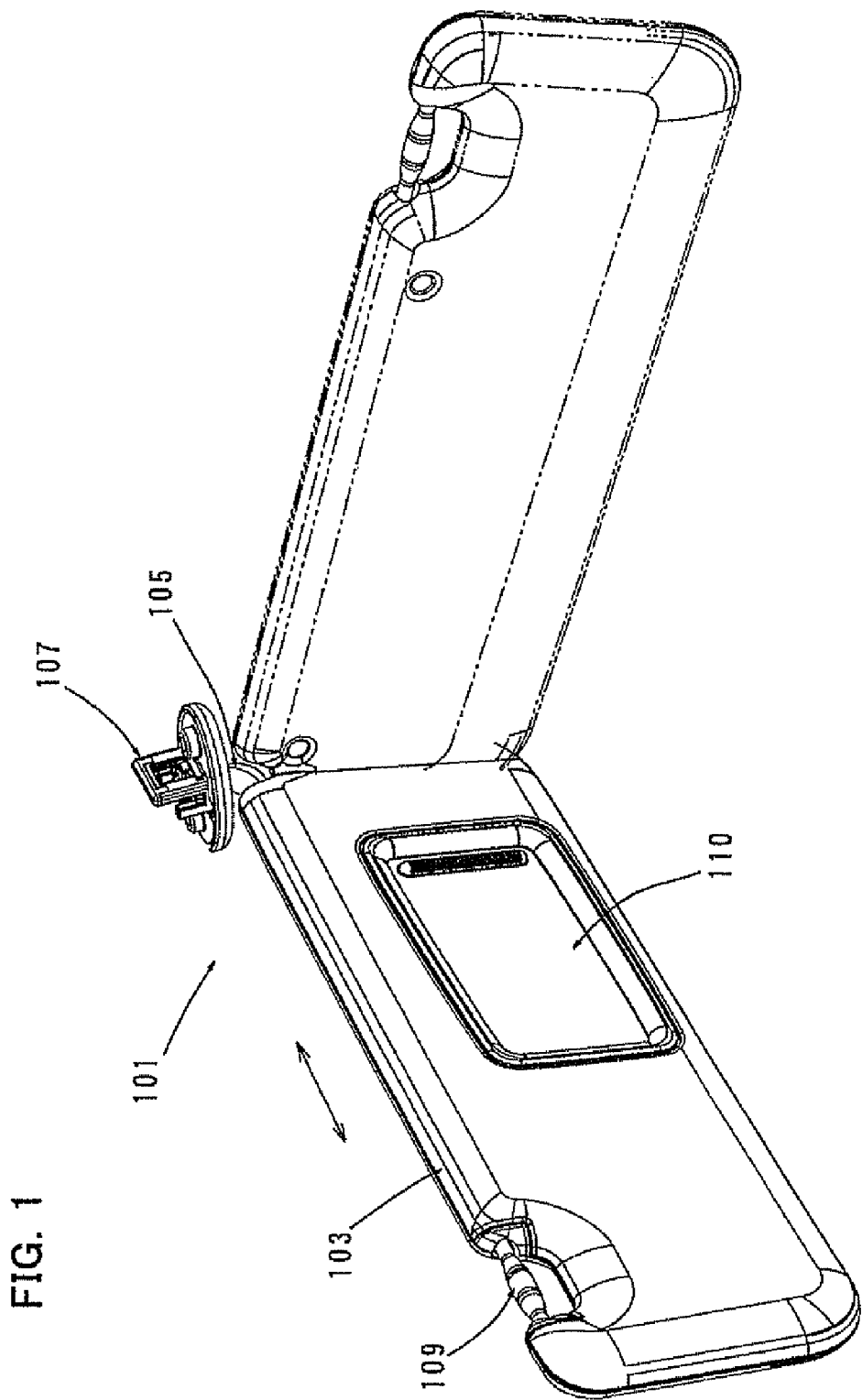
FIG. 1 is a perspective view showing the entire structure of a sun visor for vehicles according to a first embodiment of the invention, in which a sun visor body placed along a windshield is shown by solid line and the sun visor body pivoted toward a side window is shown by two-dot chain line.

A sun visor 101 for vehicles according to the first embodiment of the invention is now described with reference to FIGS. 1 to 7. FIG. 1 schematically shows the entire construction of the sun visor 101 according this embodiment. As shown in FIG. 1, the sun visor 101 for vehicles according to this embodiment mainly includes a sun visor body 103 that forms a contour of the sun visor 101 for vehicles, a support rod 105 having a circular section and provided to mount the sun visor body 103 to the vehicle, and a mounting bracket 107. The support rod 105 is generally L-shaped and has a generally vertically extending rod portion 105a and a generally horizontally extending rod portion 105b (see FIGS. 2 and 3). Further, the horizontal rod portion 105b is pivotally mounted to an upper edge of the sun visor body 103. The vertical rod portion 105a of the support rod 105 is pivotally mounted to a front corner (a right corner in the sun visor according to this embodiment) of an interior roof surface of the vehicle via the mounting bracket 107.

The sun visor body 103 is mounted onto the horizontal rod portion 105b of the support rod 105 such that it can pivot on an axis of the horizontal rod portion 105b and slide in the axial direction. The structure for such pivotal and sliding movement is described below. For the sake of convenience of explanation, the axial direction of the horizontal rod portion 105b or the sliding direction shown by an arrow in FIG. 1 is referred to as a lateral direction, the axial direction of the vertical rod portion 105a as a vertical direction, and a horizontal direction transverse to the axial direction of the horizontal rod portion 105b as a fore-and-aft direction.

Although not shown, by turning the sun visor body 103 around the axis of the horizontal rod portion 105b of the support rod 105, the position of the sun visor body 103 can be changed between a storage position along the interior roof surface of the vehicle and a use (sun shading) region along the windshield. Further, by turning the sun visor body 103 around the axis of the vertical rod portion 105a, the position of the sun visor body 103 can be changed between a front position along the windshield (which is shown by solid line in FIG. 1) and a side position along a side window (which is shown by two-dot chain line in FIG. 1). Further, in the side position, the position (sun shading position) of the sun visor body 103 with respect to the side window can be changed by sliding the sun visor body 103 in the axial direction of the horizontal rod portion 105b.

Further, the sun visor body 103 has a support shaft 109 in a free end region of its upper edge. The support shaft 109 is held by a hook (not shown) mounted on the front interior roof surface of the vehicle, so that the pivotal movement of the sun visor body 103 in the front position between the storage position and the use position can be stabilized. Further, a vanity mirror 110 is disposed in a planar region on the outer surface of the sun visor body 103.

Figure 2:
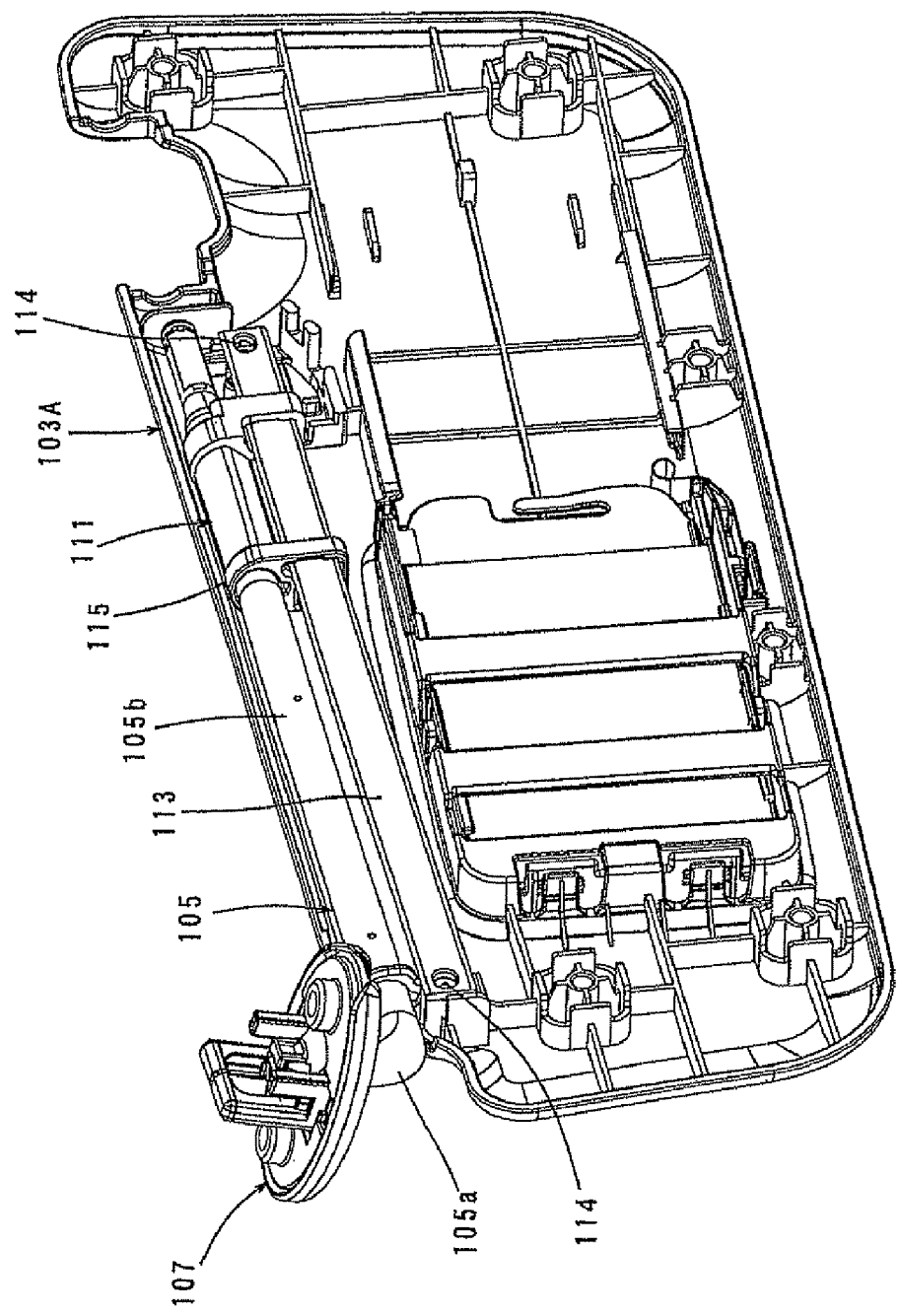
FIG. 2 is a perspective view of the sun visor body, in which one body component is not shown and the other body component is shown with a sliding structure mounted thereto in the state in which the sun visor body is placed in an initial position adjacent to a vertical rod portion of a support rod.
Figure 3:
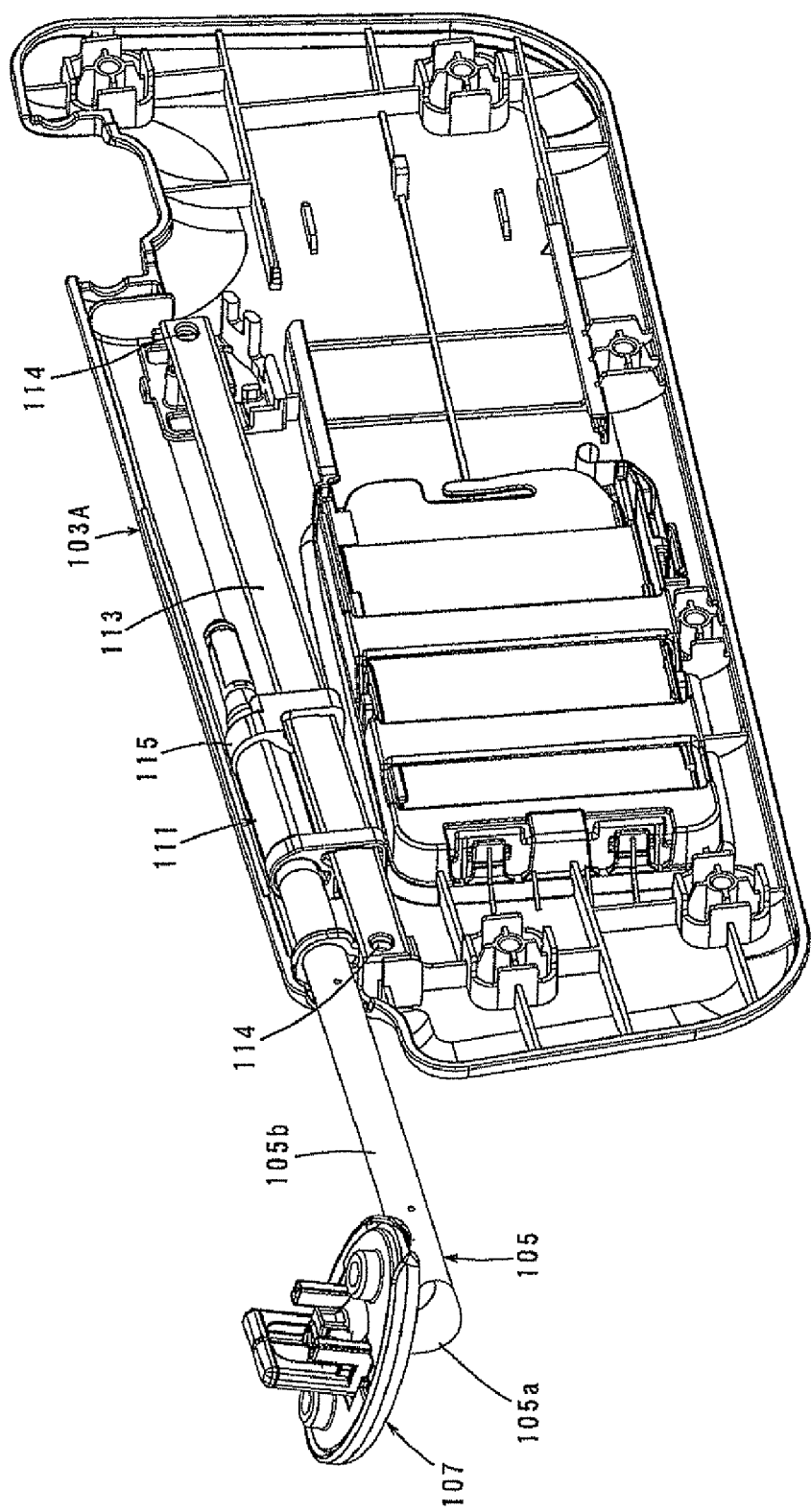
FIG. 3 is a perspective view showing the sun visor body, in which one body component is not shown and the other body component is shown with the sliding structure mounted thereto in the state in which the sun visor body is placed in an extended position away from the vertical rod portion of the support rod.
Figure 6:
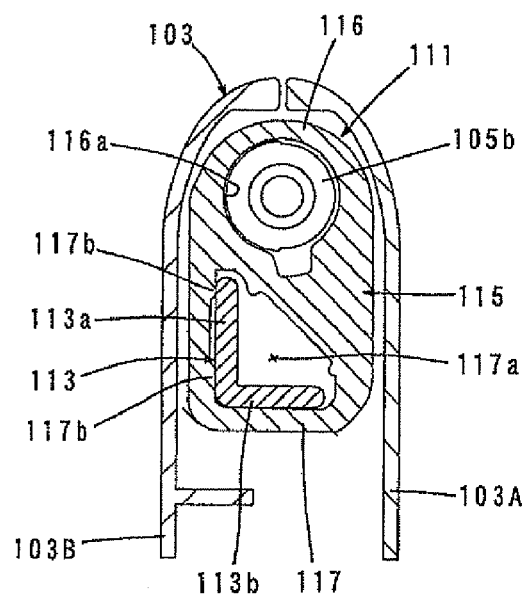
FIG. 6 is a sectional view showing part of the sliding structure.
Figure 7:
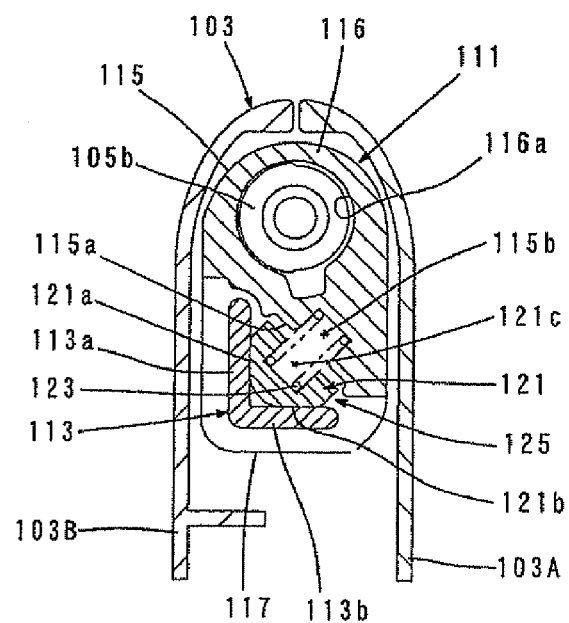
FIG. 7 is a sectional view also showing part of the sliding structure, but taken at a different position.

As shown in FIGS. 6 and 7 in section, the sun visor body 103 has two halves or body component parts 103A, 103B which are opposed to each other and joined together in the fore-and-aft direction so as to form a hollow shell structure. The outer surface of the sun visor body 103 is covered with a skin. Specifically, the sun visor body 103 has a hollow inner space. In FIGS. 2 and 3, one body component 10313 (rear half of the sun visor body 103 placed in the use region) is not shown and only the other body component 103A (front half) is shown. Further, a sliding structure 111 is mounted to the body component 103A and allows the sun visor body 103 to pivot and slide in the axial direction with respect to the support rod 105. FIGS. 2 and 3 show how the sun visor body 103 slides. FIG. 2 shows the sun visor body 103 placed in one end position adjacent to the vertical rod portion 105a. FIG. 3 shows the sun visor body 103 slid to the other end position away from the vertical rod portion 105a.

The sliding structure 111 is now explained mainly with reference to FIGS. 4 to 7. The sliding structure 111 mainly includes a guide rail 113 fixed to the other body component 103A and a slide case 115 that can relatively slide along the guide rail 113. The guide rail 113 and the slide case 115 are features that correspond to the "guide member" and the "movable element", respectively, in this invention.

The guide rail 113 is shaped in an elongate form having a uniformly L-shaped section and horizontally extends along the upper edge of the sun visor body 103. Specifically, the guide rail 113 is an elongate member having a generally L-shaped section and formed by a vertical portion 113a and a horizontal portion 113b. When viewed from one end of the horizontal rod portion 105b of the support rod 105 in the state in which the sun visor body 103 is pivoted to the use region and vertically placed, the vertical portion 113a extends in the vertical direction transverse to the pivot of the sun visor body 103 (the axis of the horizontal rod portion 105b of the support rod 105), and the horizontal portion 113b extends transversely to the vertical portion 113a. Further, mounting holes 114 are formed in both ends of the vertical portion 113a of the guide rail 113 in its extending direction, and the guide rail 113 is fastened to a mounting part on an inner wall surface of the other body component 103A by using screws (not shown) through the mounting holes 114, so that the guide rail 113 is integrated with the sun visor body 103.

The slide case 115 is disposed within the hollow space of the sun visor body 103. The slide case 115 has rod receiving parts 116 formed in upper regions of its right and left ends or its both ends in the axial direction of the horizontal rod portion 105b (in the sliding direction of the sun visor body 103), and legs 117 formed in lower regions of the right and left ends. Each of the rod receiving parts 116 has a circular through hole 116a and each of the legs 117 has a generally triangular hole 117a, and the through hole 116a and the triangular hole 117a are formed in parallel to each other.

The horizontal rod portion 105b of the support rod 105 is inserted through the through holes 116a of the right and left rod receiving parts 116 of the slide case 115. The slide case 115 is mounted to the horizontal rod portion 105b such that the rod receiving parts 116 cannot move in the axial direction of the horizontal rod portion and can pivot around its axis with respect to the horizontal rod portion 105b. Further, the guide rail 113 is slidably inserted through the triangular holes 117a of the right and left legs 117. With such a construction, the sun visor body 103 can slide in the axial direction of the horizontal rod portion 105b together with the guide rail 113 with respect to the slide case 115. Thus the position of the sun visor body 103 can be changed between one end position (shown in FIG. 2) adjacent to the vertical rod portion 105a (the base of the horizontal rod portion 105b) of the support rod 105 and the other end position (shown in FIG. 3) away from the vertical rod portion 105a. The sun visor body 103 placed in the one end position can be pivoted between the storage position and the use region. Further, in the following description, for the sake of convenience of explanation, the one end position adjacent to the vertical rod portion 105a is referred to as an initial position and the other end position away from the vertical rod portion 105a as an extended position.

As shown in FIG. 6, a plurality of projections 117b extending in the sliding direction of the guide rail 113 are formed on a portion of the inner wall surface of the triangular hole 117a of each of the right and left legs 117 which faces the vertical portion 113a of the guide rail 113. The projections 117b are designed to come in surface contact with the outer surface of the vertical portion 113a of the guide rail 113. By provision of such projections 117b, the contact area of the guide rail 113 with the slide case 115 can be controlled.

Figure 4:
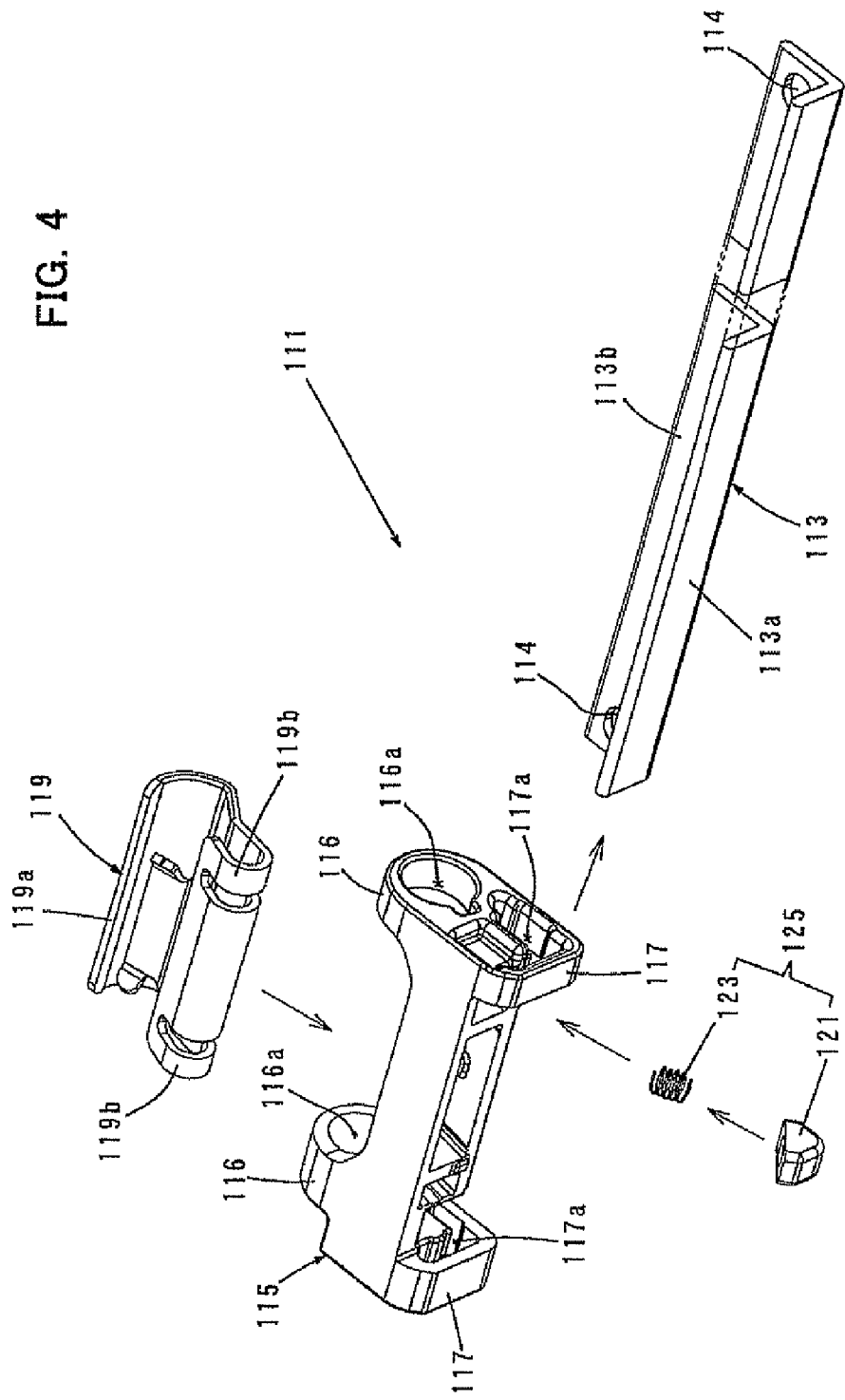
FIG. 4 is a perspective exploded view showing the sliding structure.
Figure 5:
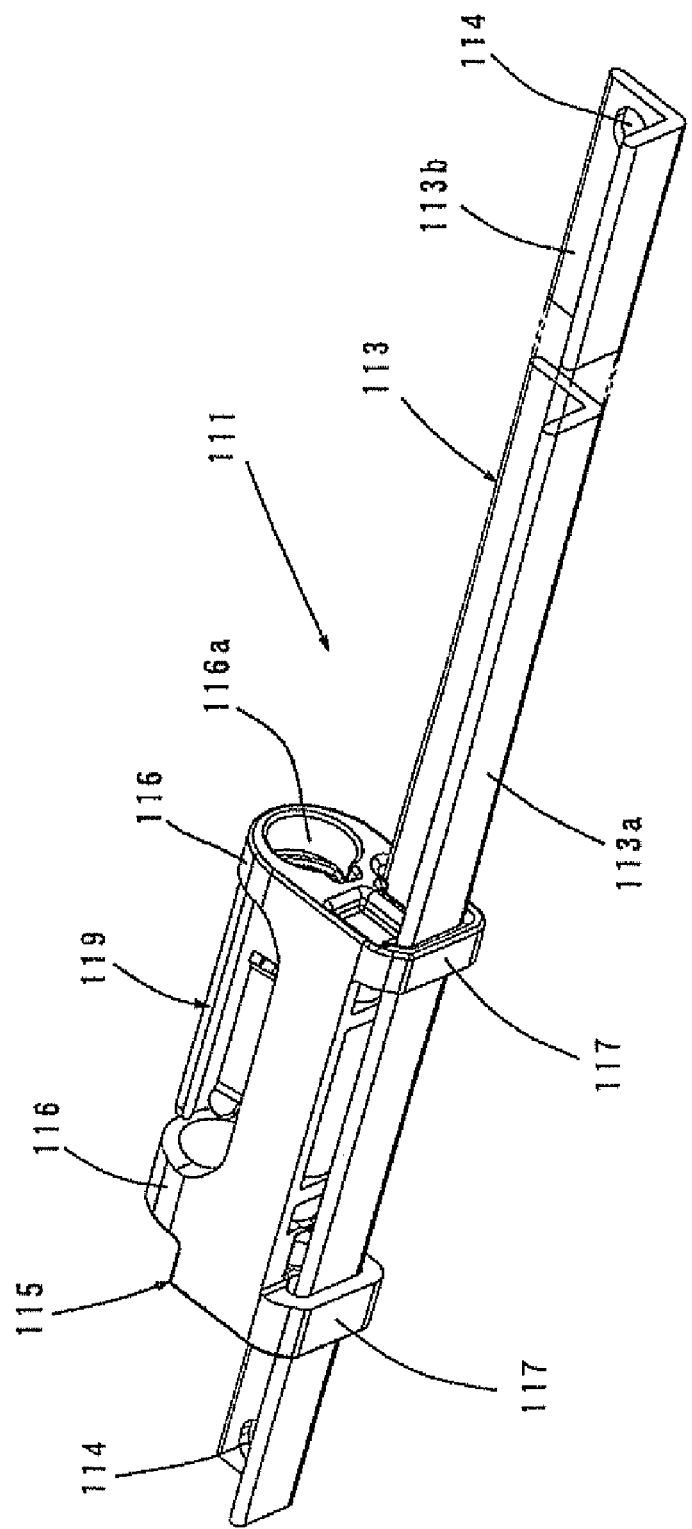
FIG. 5 is a perspective view showing the sliding structure in an assembled state.

Further, a clip 119 is mounted to the slide case 115 (see FIGS. 4 and 5). When the sun visor body 103 is pivoted between the storage position and the use region, the clip 119 serves to impose a predetermined pivotal resistance to the pivotal movement. The slide case 115 has an open top for clip mounting between the right and left rod receiving parts 116, and a leg 119b of the clip 119 is inserted into the top opening so that the clip 119 is prevented from becoming detached from the slide case 115. The clip 119 has a holding part 119a which exerts a biasing force on the horizontal rod portion 105b of the support rod 105 so as to hold the horizontal rod portion 105b from outside in the radial direction. In the inserted state of the horizontal rod portion 105b, the holding part 119a holds the horizontal rod portion 105b in such a manner as to impose a predetermined frictional resistance to the pivotal movement of the slide case 115 and the horizontal rod portion 105b with respect to each other. Further, the structures of the clip 119 for mounting it to the slide case 115 and for imposing the pivotal resistance on the slide case 115 are well known in the art and not directly related to the invention, and therefore they are not described in further details.

A friction mechanism 125 is provided in a lower part (on the leg 117 side) of the slide case 115 and serves to impose an appropriate frictional resistance (sliding resistance) to the sliding movement of the guide rail 113 with respect to the slide case 115. Further, as shown in FIG. 4, the slide case 115 has an open bottom in an intermediate region between the right and left legs 117, and by utilizing this opening, the friction mechanism 125 can be mounted to the slide case 115 and the guide rail 113.

As shown in FIGS. 4 and 7, the friction mechanism 125 mainly includes a friction pad 121 which is slidably held in contact with the guide rail 113, and a coil spring 123 which applies a biasing force on the friction pad 121 in such a manner as to press the friction pad 121 against the guide rail 113. The friction pad 121 and the coil spring 123 are features that correspond to the "sliding member" and the "biasing member", respectively, in this invention. The friction pad 121 is disposed between an L-shaped space for the guide rail 113 having the L-shaped section and an inner wall surface 115a of the slide case 115. The friction pad 121 is a generally block-like member and has two surfaces (two sides) which are opposed to each other so as to form an L-shaped tip end. The two surfaces are formed by inclined surfaces 121a, 121b such that the friction pad 121 is tapered (decreases in width) toward the tip end. One inclined surface (tapered surface) 121a is held in contact with the inner surface of the vertical portion 113a of the guide rail 113 and the other inclined surface (tapered surface) 121b is held in contact with the inner surface of the horizontal portion 113b of the guide rail 113.

Further, right and left stopper pieces (not shown) are provided in the slide case 115 and extend downward. The stopper pieces are held in contact with right and left outer surfaces of the friction pad 121, so that the friction pad 121 is prevented from moving in the lateral direction (sliding direction) when the guide rail 113 slides with respect to the slide case 115.

The coil spring 123 is disposed between the friction pad 121 and the inner wall surface 115a of the slide case 115 and applies a biasing force in such a manner as to press the friction pad 121 against the two wall surfaces of the guide rail 113. Specifically, as shown in FIG. 7, the coil spring 123 is provided and arranged such that its biasing force is applied toward an intersection of the vertical portion 113a and the horizontal portion 113b of the guide rail 113. Therefore, by components of the biasing force of the coil spring 123, the inclined surface 121a of the friction pad 121 is pressed against the vertical portion 113a of the guide rail 113 in surface contact, and the other inclined surface 121b is pressed against the horizontal portion 113b of the guide rail 113 in surface contact. Thus, a predetermined frictional resistance is correspondingly imposed to the sliding movement of the guide rail 113. Further, the forces acting upon the vertical portion 113a and the horizontal portion 113b of the guide rail 113 are received by the legs 117 of the slide case 115. The one inclined surface 121a and the other inclined surface 121b of the above-described friction pad 121 are features that correspond to the "plurality of sliding regions" in this invention, and they also correspond to the "first sliding region" and the "second sliding region", respectively, in this invention.

Further, the coil spring 123 is housed within a spring receiving recess 121c formed in the friction pad 121 and a spring receiving recess 115b formed in the slide case 115, so that the coil spring 123 is prevented from deforming in a direction transverse to a longitudinal direction (a direction of expansion and contraction) of the spring.

The sun visor 101 for vehicles according to this embodiment is constructed as described above. Therefore, the sun visor body 103 can be pivoted around the horizontal rod portion 105b of the support rod 105 so as to be moved from the storage position to the use region, so that the sun visor 101 can be used in the use region. Further, as shown in FIG. 1, the sun visor body 103 can be pivoted around the vertical rod portion 105a of the support rod 105 so as to be moved from the windshield side to the side window side, so that the sun visor 101 can be used on the side window side. Further, when using the sun visor 101 placed in this position along the side window, the position (sun shading position) of the sun visor body 103 can be changed with respect to the side window by sliding the sun visor body 103 in the axial direction of the horizontal rod portion 105b.

In this embodiment, the guide rail 113 is L-shaped in section and the spring-biased friction pad 121 is pressed against the vertical portion 113a of the guide rail 113 and the horizontal portion 113b extending transversely to the vertical portion 113a, so that frictional resistance is imposed to the sliding movement of the sun visor body 103 with respect to the slide case 115. Specifically, with the construction in which the friction pad 121 is pressed against the vertical portion 113a and the horizontal portion 113b on which the biasing force acts in different directions, the friction pad 121 can be prevented from rattling with respect to the guide rail 113 in the vertical direction and the fore-and-aft direction. Thus, rattling noise (interfering noise) can be prevented from being generated between the guide rail 113 and the friction pad 121 when the sun visor body 103 is moved in the axial direction of the horizontal rod portion 105b of the support rod 105 in order to change the sun-shading position, or by vibration of the vehicle body. Furthermore, stability of the sliding movement of the sun visor body 103 with respect to the support rod 105 can be achieved.

The biasing force of the coil spring 123 is applied to press the friction pad 121 against the guide rail 113 such that the inner wall surface of the triangular hole 117a of the leg 117 of the slide case 115 and the outer surfaces of the vertical portion 113a and the horizontal portion 113b of the guide rail 113 inserted through the triangular hole 117a are pressed against each other. Specifically, the slide case 115 and the guide rail 113 are held in close contact with each other in the vertical direction and the fore-and-aft direction which are transverse to the direction of the sliding movement. With such a construction, rattle between the slide case 115 and the guide rail 113 is prevented, so that interfering noise caused by vibration of the vehicle body can be prevented.

Further, according to this embodiment, by provision of the construction in which the biasing force of the coil spring 123 is divided into two forces, or a force that presses the inclined surface 121a of the friction pad 121 against the vertical portion 113a of the guide rail 113 and a force that presses the other inclined surface 121b of the friction pad 121 against the horizontal portion 113b of the guide rail 113, the friction pad can be pressed in two different directions by using one coil spring 123. Thus, the number of parts of the friction mechanism 125 can be reduced, so that cost reduction can be realized.

Second Embodiment of the Invention

A second embodiment of the invention is now explained with reference to FIGS. 8 and 9. This embodiment is a modification of the guide rail in which friction resistance is imposed by the friction mechanism, and the L-shaped rail in the above-described first embodiment is changed to a V-shaped rail.

Figure 8:
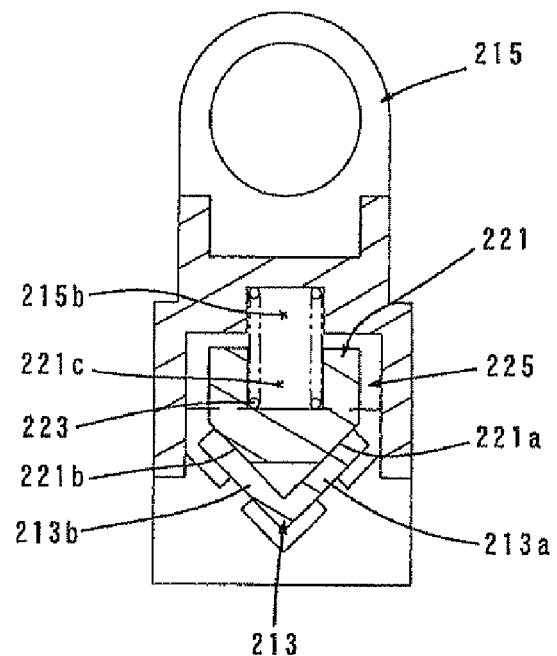
FIG. 8 is a sectional view showing a friction mechanism according to a second embodiment of the invention.
Figure 9:
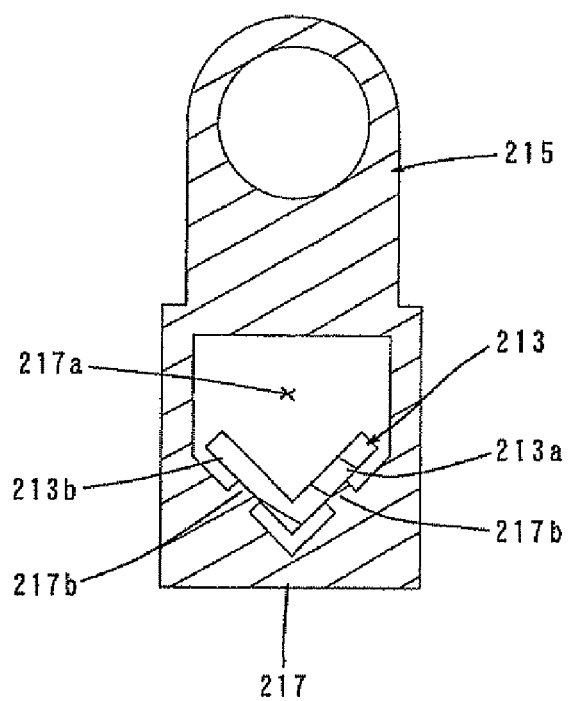
FIG. 9 is a sectional view showing a sliding part between a guide rail and a slide case according to the second embodiment of the invention.

As shown in FIGS. 8 and 9, a guide rail 213 in this embodiment is formed by an elongate member having a uniformly V-shaped section. Specifically, the guide rail 213 includes two inclined parts 213a, 213b which are inclined at a predetermined angle to a vertical line transverse to the axis of the horizontal rod portion 105b of the support rod 105 and extend transversely to each other, when viewed from one end of the horizontal rod portion 105b of the support rod 105 in the state in which the sun visor body 103 is vertically placed. More particularly, the guide rail 213 is formed by the inclined parts 213a, 213b which are symmetrical with respect to a vertical line.

As shown in FIG. 9, a square hole 217a of a leg 217 of a slide case 215 through which the guide rail 213 is inserted is correspondingly configured to have a V-shaped lower portion. A plurality of projections 217b are formed on the V-shaped wall of the hole 217a and extend in the sliding direction of the guide rail 213. The projections 217b are designed to come in surface contact with the outer surfaces of the inclined parts 213a, 213b of the guide rail 213. In this manner, by provision of the projections 217, the contact area of the guide rail 213 with the slide case 215 can be controlled.

As shown in FIG. 8, a friction pad 221 of a friction mechanism 225 is a generally block-like member having two surfaces (two sides) which are opposed to each other so as to form a V-shaped tip end. The two surfaces are formed by inclined surfaces 221a, 221b such that the friction pad 221 is tapered (decreases in width) toward the tip end. One inclined surface (tapered surface) 221a is held in contact with the inner surface of one inclined portion 213a of the guide rail 213 and the other inclined surface (tapered surface) 221b is held in contact with the inner surface of the other inclined portion 213b of the guide rail 213. The friction pad 221 is a feature that corresponds to the "sliding member" in this invention.

A coil spring 223 of the friction mechanism 225 is disposed between the friction pad 221 and the slide case 215 and applies a biasing force in such a manner as to press the friction pad 221 against the two wall surfaces of the guide rail 213. Specifically, the coil spring 223 is provided and arranged such that its biasing force is applied toward an intersection of the two inclined portions 213a, 213b of the guide rail 213. Therefore, by components of the biasing force of the coil spring 223, the one inclined surface 221a and the other inclined surface 221b are pressed against the one inclined portion 213a and the other inclined portion 213b of the guide rail 213 in surface contact, respectively, so that a predetermined frictional resistance is imposed to the sliding movement of the guide rail 213. Further, the forces acting upon the inclined portions 213a, 213b of the guide rail 213 are received by the projections 217b of the leg 217 of the slide case 215. The coil spring 223 is a feature that corresponds to the "biasing member" in this invention. The one inclined surface 221a and the other inclined surface 221b of the friction pad 221 are features that correspond to the "plurality of sliding regions", in this invention, and they also correspond to the "first sliding region" and the "second sliding region", respectively, in this invention.

Further, the coil spring 223 is housed within a spring receiving recess 221c formed in the friction pad 221 and a spring receiving recess 215b formed in the slide case 215, so that the coil spring 223 is prevented from deforming in a direction transverse to a longitudinal direction (a direction of expansion and contraction) of the spring.

This embodiment is constructed as described above. Therefore, according to this embodiment, with the construction in which the friction pad 221 having a V-shaped tip end is pressed against the inclined portions 213a, 213b of the V-shaped guide rail 213, like the first embodiment, the friction pad 221 can be prevented from rattling with respect to the guide rail 213 in the vertical direction and the fore-and-aft direction. Thus, rattling noise (interfering noise) can be prevented from being generated between the guide rail 213 and the friction pad 221 when the sun visor body 103 is moved in the axial direction of the horizontal rod portion 105b of the support rod 105 in order to change the sun-shading position, or by vibration of the vehicle body. Furthermore, stability of the sliding movement of the sun visor body 103 with respect to the support rod 105 can be achieved.

As shown in FIG. 9, the biasing force of the coil spring 223 is applied to press the friction pad 221 against the guide rail 213 such that the wall surfaces of the square hole 217a of the leg 217 of the slide case 215 and the outer surfaces of the two inclined portions 213a, 213b of the guide rail 213 inserted through the square hole 217a are pressed against each other. Specifically, the slide case 215 and the guide rail 213 are held in close contact with each other in the vertical direction and the fore-and-aft direction which are transverse to the direction of the sliding movement. With such a construction, rattle between the slide case 215 and the guide rail 213 is prevented, so that interfering noise caused by vibration of the vehicle body can be prevented.

Figure 10:
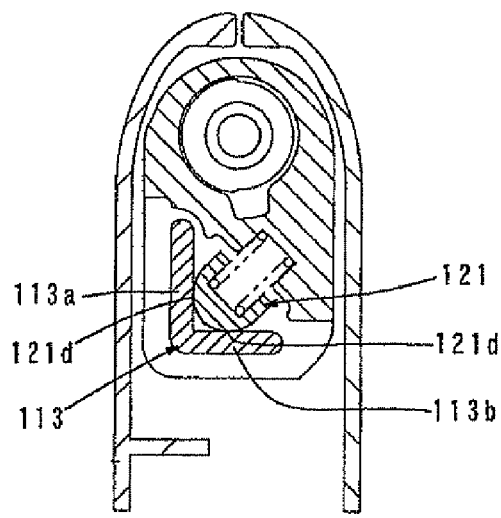
FIG. 10 is a view showing a modification of the invention.
Figure 11:
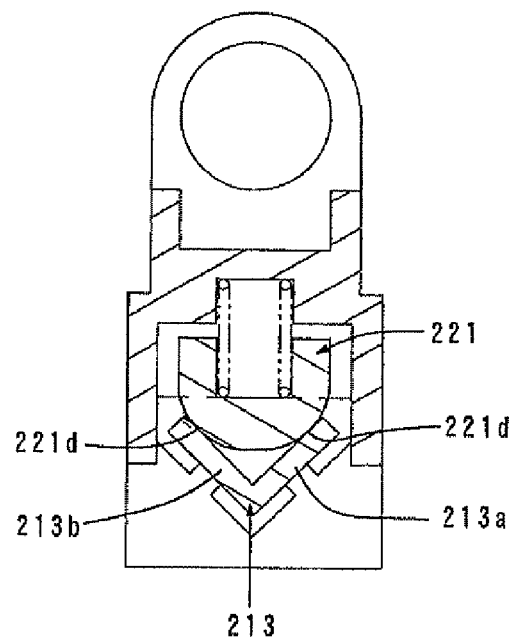
FIG. 11 is a view showing a modification of the invention.

In the above-described embodiments, in either case of the L-shaped guide rail 113 and the V-shaped guide rail 213, the guide rail 113 or 213 and the friction pad 121 or 221 are designed to be held in plane contact with each other. As shown in FIGS. 10 and 11, however, the friction pads 121, 221 may be shaped to have tip ends which are formed by curved surfaces 121d, 221d having an arcuate section so that the friction pads 121, 221 are held in curved-surface contact with the vertical portion 113a and the horizontal portion 113b of the guide rail 113 or the two inclined portions 213a, 213b of the guide rail 213.

Further, although not shown, the guide rails 113, 213 and the friction pads 121, 221 may be designed to come in curved-surface contact with each other between curved surfaces, or in line contact or point contact with a plane or curved surface, instead of the above-described plane contact between the plane surfaces.

Further, instead of the construction in which the friction pads 121, 221 are biased toward the guide rails 113, 213 by the coil springs 123, 223, although not shown, it may be constructed such that the guide rails 113, 213 are spring-biased toward the friction pads 121, 221.

DESCRIPTION OF NUMERALS 101 sun visor for vehicles
103 sun visor body
103A body component
103B body component
105 support rod
105a vertical rod portion
105b horizontal rod portion
107 mounting bracket
109 support shaft
110 vanity mirror
111 sliding structure
113 guide rail (guide member)
113a vertical portion
113b horizontal portion
114 mounting hole
115 slide case (movable element)
115a inner wall surface
115b spring receiving recess
116 rod receiving part
116a through hole
117 leg
117a triangular hole
117b projection
119 clip
119a holding portion
119b leg
121 friction pad
121a inclined surface
121b inclined surface
121c spring receiving recess
121d curved surface
123 coil spring
125 friction mechanism
213 guide rail
213a inclined portion
213b inclined portion
215 slide case
215b spring receiving recess
217 leg
217a square hole
217b projection
221 friction pad
221a inclined surface
221b inclined surface
221c spring receiving recess
221d curved surface
223 coil spring
225 friction mechanism

What we claim is:

1. A sun visor for vehicles comprising:
a sun visor body;
a support rod for mounting the sun visor body to a vehicle body, body;
an elongate guide member that is fixedly disposed within the sun visor body and extends in an axial direction of the support rod;
a movable element that is disposed within the sun visor body and mounted to the support rod such that the movable element is allowed to pivot around an axis of the support rod while being prevented from moving in the axial direction of the support rod with respect to the support rod, the movable element also mounted to the guide member such that the movable element is allowed to move in the axial direction of the support rod with respect to the guide member, wherein
a position of the sun visor body can be changed between a predetermined storage position and a use region other than the storage position by pivoting the sun visor body around the axis of the support rod together with the guide member and the movable element, and further, a position of the sun visor body with respect to the support rod can be changed in the axial direction of the support rod by moving the sun visor body together with the guide member with respect to the movable element;
a sliding member that is held in contact with the guide member and can slide with respect to the guide member,
a biasing member that applies a biasing force to hold the sliding member and the guide member in contact with each other,
wherein:
the biasing force of the biasing member is divided into different directions and exerted between the sliding member and the guide member, whereby a frictional force which corresponds to components of the biasing force divided into the different directions is generated between the sliding member and the guide member,
the guide member includes a vertical portion extending in a vertical direction transverse to the axis of the support rod and a horizontal portion extending transversely to the vertical portion in a state in which the sun visor body is vertically placed, and the sliding member has a first sliding region which is held in contact with the vertical portion of the guide member and a second sliding region which is held in contact with the horizontal portion of the guide member,
the sliding member comprises a friction pad as a generally block-like member, the friction pad having two surfaces which are opposed to each other, and
one of the surfaces is held in contact with the inner surface of the vertical portion and the other of the surfaces is held in contact with the inner surface of the horizontal portion.

2. The sun visor for vehicles as defined in claim 1, wherein the sliding member has a plurality of sliding regions which are held in contact with the guide member, and the sliding regions are configured to receive the components of the biasing force divided into the different directions.

3. The sun visor for vehicles comprising:
a sun visor body;
a support rod for mounting the sun visor body to a vehicle body;
an elongate guide member that is fixedly disposed within the sun visor body and extends in an axial direction of the support rod, the guide member including a vertical portion extending in a vertical direction transverse to an axis of the support rod and a horizontal portion extending transversely to the vertical portion in a state in which the sun visor body is vertically placed;
a sliding member that is held in contact with the guide member and can slide with respect to the guide member, the sliding member having a first sliding region which is held in contact with the vertical portion of the guide member and a second sliding region which is held in contact with the horizontal portion of the guide member; and
a biasing member that applies a biasing force to hold the sliding member and the guide member in contact with each other, the biasing member comprising a spring, wherein the biasing force of the biasing member is divided into different directions and exerted between the sliding member and the guide member, whereby a frictional force which corresponds to components of the biasing force divided into the different directions is generated between the sliding member and the guide member; and
a movable element that is disposed within the sun visor body and mounted to the support rod such that the movable element is allowed to pivot around an axis of the support rod while being prevented from moving in the axial direction of the support rod with respect to the support rod, the movable element also mounted to the guide member such that the movable element is allowed to move in the axial direction of the support rod with respect to the guide member,
wherein a position of the sun visor can be changed between a predetermined storage position and a use region other than the storage position by pivoting the sun visor body around the axis of the support rod together with the guide member and the movable element, and further, a position of the sun visor body with respect to the support rod can be changed in the axial direction of the support rod by moving the sun visor body together with the guide member with respect to the movable element.

4. The sun visor for vehicles according to claim 3, wherein the sliding member comprises a friction pad as a generally block-like member, the friction pad having two surfaces which are opposed to each other,
wherein one of the surfaces is held in contact with the inner surface of the vertical portion and the other of the surfaces is held in contact with the inner surface of the horizontal portion.

* * * * *